United States Patent [19]

Dawson

[11] 4,170,624

[45] Oct. 9, 1979

[54] BLOWN TUBE COLLAPSE FRAME ASSEMBLY

[75] Inventor: Charles Dawson, Marblehead, Mass.

[73] Assignee: General Electric Company, Hudson Falls, N.Y.

[21] Appl. No.: 824,082

[22] Filed: Aug. 12, 1977

Related U.S. Application Data

[60] Division of Ser. No. 666,508, Mar. 12, 1976, Pat. No. 4,068,999, which is a continuation-in-part of Ser. No. 349,643, Apr. 9, 1973, abandoned.

[51] Int. Cl.² ............................................. B29C 15/00
[52] U.S. Cl. .................................... 264/564; 264/209; 264/237
[58] Field of Search .................... 264/95, 89, 209, 237, 264/555, 563, 564; 425/326.1, 72 R, 392

[56] References Cited

U.S. PATENT DOCUMENTS

| | | | |
|---|---|---|---|
| 2,641,022 | 6/1953 | Kress | 425/326 |
| 2,720,680 | 10/1955 | Gerow | 264/95 |
| 3,335,208 | 8/1967 | Harris | 264/95 |
| 3,355,770 | 12/1967 | Augustin | 425/326.1 |
| 3,930,781 | 1/1976 | Upmeier | 425/72 R |

*Primary Examiner*—Jeffery R. Thurlow
*Attorney, Agent, or Firm*—James J. Lichiello

[57] ABSTRACT

In a blown tube process of producing thermoplastic film or sheeting, the blown tube is collapsed by passing it through a trapezoidal frame assembly to change the circular cross section of the tube to a square cross section. The square cross section tube passing from the trapezoidal frame assembly is then passed through a predeterminedly controlled flattening transition section to a pair of nip rolls in a manner that the film arrives at the nip rolls with minimal stretching.

5 Claims, 8 Drawing Figures

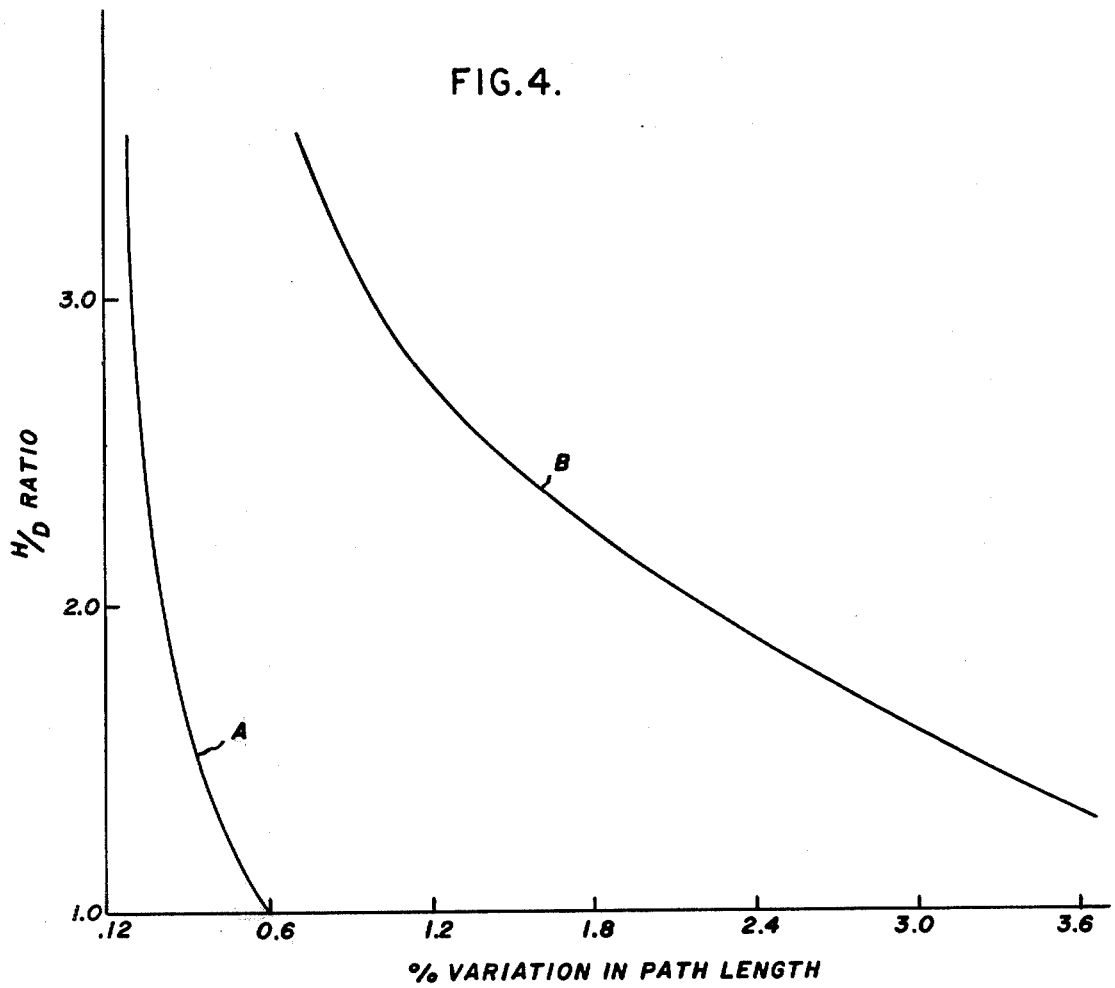

BLOWN TUBE COLLAPSE FRAME ASSEMBLY

BACKGROUND OF THE INVENTION

1. Field of the Invention

This is a division, of application Ser. No. 666,508, filed Mar. 12, 1976, now U.S. Pat. No. 4,068,999, issued Jan. 17, 1978, which application was a continuation-in-part application of copending application Ser. No. 349,643 filed Apr. 9, 1973, now abandoned, all assigned to the same assignee as the present invention.

This invention relates to an improved blown tube collapse frame assembly comprising a trapezoid section to change the cross section of a circular tube of thermoplastic material passing therethrough to a square cross section, and a transition section to pass the material from the square section to a flattened section between a pair of nip rolls with minimal material stretching in the process.

2. DESCRIPTION OF THE PRIOR ART

The blown tube process of producing thermoplastic film is well known in the prior art. One example of such a process is found in U.S. Pat. No. 2,720,680, Gerow, wherein a thermoplastic material is melt extruded in tubular form and the tubular form is retained by means of internal air pressure. The tube is passed between a pair of nip rolls to be wound into strips or sheeting. As taught in the Gerow disclosure, the pressure within the tube may be increased to expand the tube or to biaxially orient the thermoplastic material of the tube or bubble.

One of the principal problems in the blown tube process relates to the apparatus utilized to collapse the bubble or tube from a circular cross section to a flat cross section and from the flat section to a theoretical line between a pair of nip rolls, to be thereafter slit in film strip or sheet form. A typical prior art mechanical arrangement to provide for the collapse of a blown tube is illustrated in U.S. Pat. No. 3,235,632, Lemmer. In the typcial collapsing arrangement of Lemmer, the blown tube is caused to pass through a V shape or A frame system of rollers which collapse the blown tube on two sides, i.e., two dimensional, from a circular cross section to a flat cross section. The collapse of such a tube section immediately from a circular cross section to a flat cross section causes uneven stresses to be imposed on or set up in the film to cause stretching and bagging of the final film which is most undesirable in many applications particularly for wound capacitor roll dielectrics which require a significantly flat or lay flat film.

SUMMARY OF THE INVENTION

The principal object of this invention is to provide a confining and converging series of moving surfaces, rollers for example, which engage a blown tube passing therethrough to gradually change its circular cross section to a square cross section, and from the square cross section the tube is confined in a precise geometric configuration to pass through nip rolls.

It is another object of this invention to provide a trapezoidal frame including a first series of rollers in the sides thereof so that a blown tube passing through the frame is changed from a circular cross section to a square cross section, and an opposite trapezoidal transition section having a series of rollers in the sides thereof to flatten said square section tube to a line section with minimal material stretching.

It is another object of the invention to provide a trapezoidal frame with a ladder-like series of rollers defining each wall or side thereof which engage and collapse a circular tube to one of a reduced and square cross section and an opposite trapezoidal section with similar rollers to provide controlled flattening of the square section preceding the entry of the square cross section tube between a pair of nip rolls.

Briefly described, this invention in its preferred form comprises a trapezoid frame collapse assembly which is specifically adapted to be utilized in conjunction with the blown tube process of producing biaxially oriented polypropylene film. The frame assembly is positioned just prior to the nip rolls utilized to seal off the tube, and prepare the flattened tube for the following slitting operation. The frame assembly comprises four flat planar walls or sides, each side including a ladder-like arrangement of rolls mounted with their axes transverse to the axis of the frame and the path of the tube therethrough. The frame assembly gradually, and over an extended length of the tube transforms or converges the circular cross section of the tube at the frame entrance to one of a square cross section at the frame exit. At this point, a transition section comprising a four sided frame with a ladder-like series of rollers in each side provides a controlled divergent geometry flare out of the square section to a line section between the pair of nip rolls.

BRIEF DESCRIPTION OF THE DRAWINGS

This invention will be better understood when taken in connection with the following description and the drawings in which:

FIG. 4 is a graph comparing the variation in path lengths between the flattening process of the circular tube and the square tube.

DESCRIPTION OF THE PREFERRED EMBODIMENTS

Figure 1:
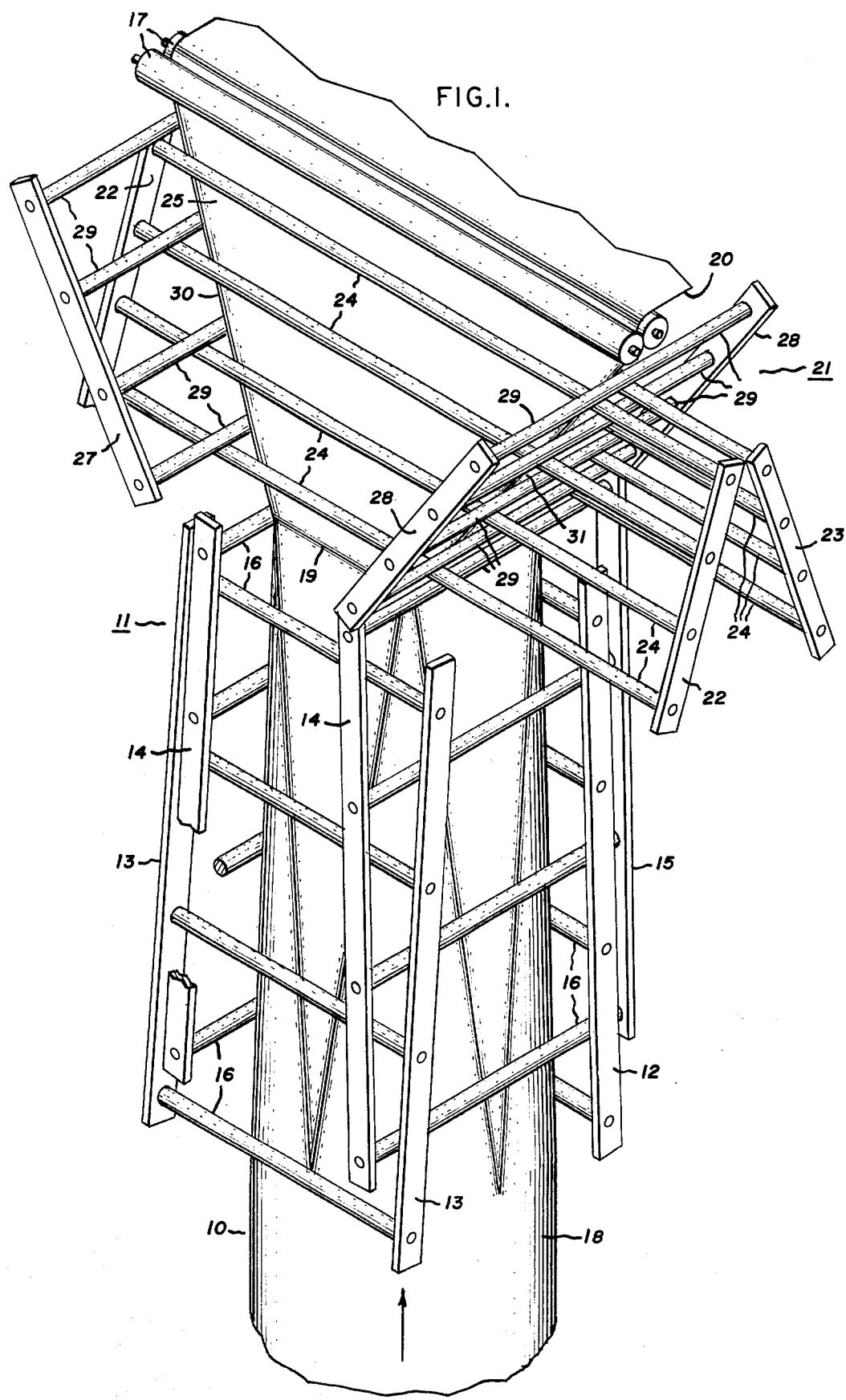
FIG. 1 is a schematic illustration of the frame assembly of this invention with a blown tube passing therethrough.

Referring now to FIG. 1, there is disclosed an inflated or blown tube 10 which may be produced from any of the well known prior art processes including those as noted in the above patents. This blown tube 10 in the present invention is isotactic polypropylene and the tube diameter is on the order of 50 inches. The tube 10 moves into a frame assembly 11 in the direction as illustrated by the arrow. The frame assembly 11 is positioned at the upper end of the tube, well away from the extrudes which forms the tube, and at a position after the tube is oriented or stretched. The frame assembly is described as adjacent the nip rolls. The frame assembly 11 in one preferred embodiment of this invention is a frame assembly of four flat planar sides 12, 13, 14 and 15, each side being defined by a series of ladder-like arrangement of rolls 16 which engage the surface of the tube in restraining fashion for passage of the tube through the frame assembly 11.

These rolls restrain and support the tube while the tube passes therethrough but do not specifically cause the tube to stretch or be compressed. The periphery of the square cross section emanating from the frame is substantially equivalent to the circumference of the tube entering the frame assembly 11. It is understood that the square cross section referred to includes as a practical matter slightly rounded corners.

The number of rolls 16 for each side of the frame assembly is not particularly critical. About 4 to 5 rolls of about 3 inches diameter for each side, and extending over a frame height of about 12 feet is sufficient for the tube material and size given. Also, the spacing of the rolls 16 is correlated to the tube material and its temperature and stretching characteristics so that the rolls are sufficiently close to each other to prevent the tube from extruding or sagging therebetween. While these rolls 16 may in fact be driven rolls, in a preferred embodiment of the invention they are slave rolls or rolls which are driven by frictional engagement with the passing tube 10. The tube 10 is drawn through the frame 11 by other driven rolls such as nip or sealing rolls 17 positioned above the frame.

The frame assembly 11 may have all four sides parallel so as to form an unvarying channel or tunnel. However, it is preferred that the frame assembly 11 have a slight trapezoidal configuration so that each side inclines toward the central axis to define an acute angle with the horizontal of no more than about 6%, and preferably about 2 to 3 degrees. This inclination provides a restraint to the tube 10 to insure a continuous and smooth transition from the round section 18 to the square section 19 and to assure that the square section is formed into a stable square section at a precise location. Otherwise variations of the diameter of tube 10 may cause the square section to form at a transitory location or cause deformation of the square cross section, and either event may disrupt the geometry of this invention. An abrupt change in the tube section is also to be avoided as the tube in the location just prior to the frame assembly 11 is still quite hot and could be adversely stretched by an abrupt transition from a round to a square section.

The blown tube 10 emanating from the trapezoidal frame assembly 11 is then caused to pass between a pair of nip rolls 17 which carry off the tube in flattened cross section for the following slitting procedures. It is an important concept of this invention that the frame assembly 11 provide a substantially square cross section tube 19 emanating from the end of the frame assembly 11. It is the square cross section 19 set up for feeding into the nip rolls 17 which will provide the collapsing of the tube from the square cross section 19 to a line or flat cross section 20 with minimal stretching and internal stressing of a film. However, the shape of the tube passing from a square cross section 19 to a line section 20 between nip rolls is critical if there is to be minimal stress and stretching of the tube material. In order to provide the correct geometry a flattening transition section 21 is provided on the end of frame assembly 11 between the square section 19 and the nip rolls 17.

Transition section 21 as disclosed in FIG. 1 comprises planar sets of roller means on opposite sides of the square section 19 which channel the square section 19 into progressively decreasing thickness rectangular sections of increasing widths until the flattened section is reached. The overall configuration of the tube 10 in the transition section is a flared out wedge shape. In one form of this invention, a planar set of roll means comprises oppositely and inwardly flared bracket members 22 and 23. Each bracket member includes one or more parallel rollers 24 mounted in ladder-like or planar relationship and positioned to engage the tube and provide it with large flat planar side surfaces 25 and 26 extending from the square section 19 to the nip rolls 17. A further set of opposite and outwardly flared bracket members 27 and 28 each comprise one or more roller members 29 in planar relationship which engage the opposite end surface 30 of the tube to form these surfaces into substantially planar surfaces. Some very small area of the tube between the upper roll 29 and the nip rolls 17 may be unsupported but the overall adverse result thereof is negligible.

An important criteria in the transition section is the acute angle $\theta_1$ (FIGS. 3 and 3A) between the plane of the brackets 22, 23 and 27, 28 and the vertical. This angle $\theta_1$ must be essentially equal for each bracket 22 and 23, and 27 and 28. In the practice of the present invention, the transition section is about 4 feet in height, and the noted angle $\theta_1$ is about 67.5° so that $\theta_2$ is 22.5° or the total apex angle is 45°. While this $\theta_1$ angle may be less than 67.5° to about 65°, its increase is more beneficient and $\theta_1$ could increase to as much as about 75° with of course a related change in $\theta_2$. When the above geometries and relationships are utilized, a point on tube 10 at the square section 19 moves toward line 20 between the nip rolls 17 along equidistant lines whose directions are ultimately perpendicular to line 20. The direction and distance of these lines portray a non stretching condition in the tube material in transition section 21.

Figure 2:
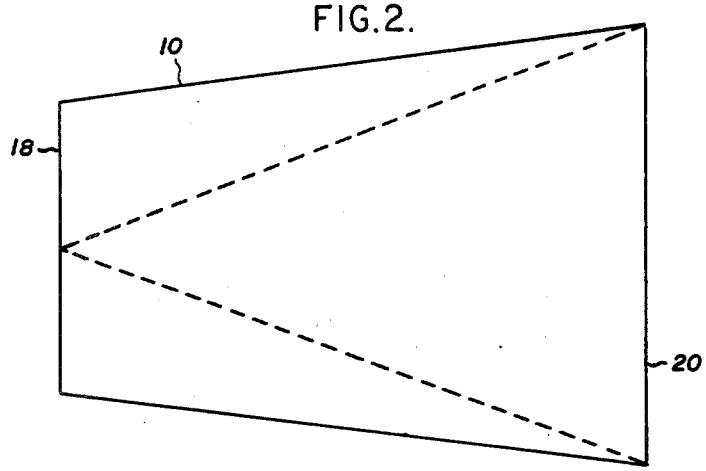
FIG. 2 is a schematic illustration of a prior art process of collapsing a circular tube to a flat cross section.
Figure 2B:
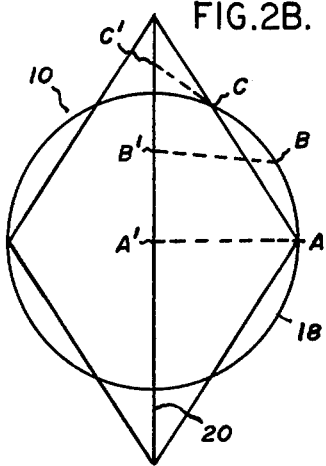
FIG. 2B is an end view of FIG. 2.
Figure 2A:
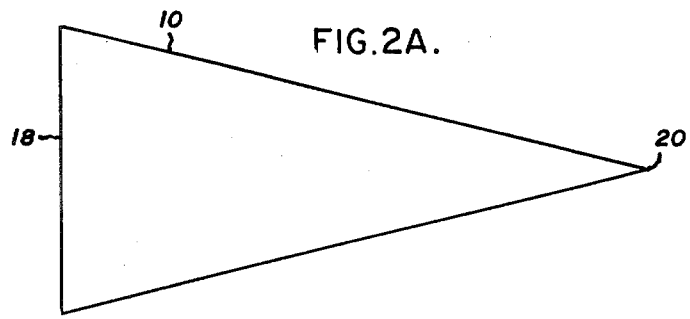
FIG. 2A is a side elevational view of FIG. 2.

The improvement of this kind of collapsing apparatus and method over those of the prior art is shown particularly with respect to the prior art FIGS. 2, 2A, and 2B. In FIG. 2, the tube 10 of circular cross section is adapted to be flattened by passing through the pair of nip rolls 17 so that it assumes the flat configuration of the line or axis 19. FIG. 2A is a side elevational view of FIG. 2 and FIG. 2B is an end view of FIG. 2. The tube 10 is of a circular cross section at line 18 and of a flat section at 19 between nip rolls 17. Now to FIG. 2B, the tube 10 becomes flattened at line 19 and in so doing each point on the tube 10 must take up a position on line 19. For example, a point A on tube 10 takes up the position A' on line 19. A point B takes up the position B'. A point C on tube 10 takes up point C' on line 19, etc. It is seen that in proceeding from points A through C and the like, each corresponding point on line 19 denotes a shorter path distance from the tube. These points on tube 10 must then travel different distances to reach the flattened configuration of line 19. These differences cause the internal stress and resulting bagginess of the film and are consequently undesirable.

Figure 3:
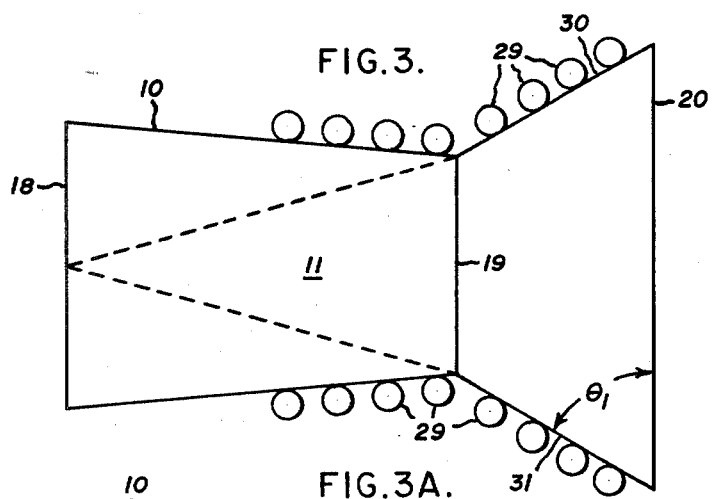
FIG. 3 is a schematic illustration of the trapezoidal frame collapsing a blown tube of circular cross section to a square cross section and then to a flat cross section in accordance with this invention.

The improvement of the invention is now shown with respect to FIG. 3. Referring to FIG. 3, the tube configuration 10 is first changed from the circular configuration 18 by means of the frame assembly 11 to the square cross section 20 as illustrated. After passing from the frame 11 with its square cross section the tube is passed through a pair of nip rolls 17 to be collapsed to the flat configuration of line 20.

Figure 3B:
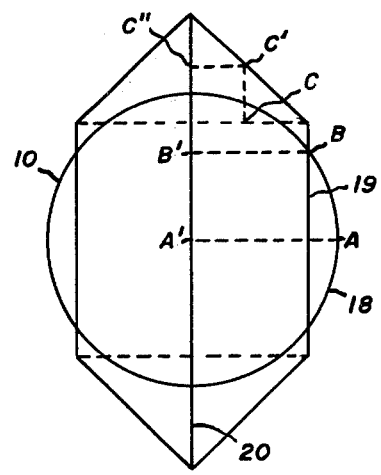
FIG. 3B is an end view of FIG. 3.
Figure 3A:
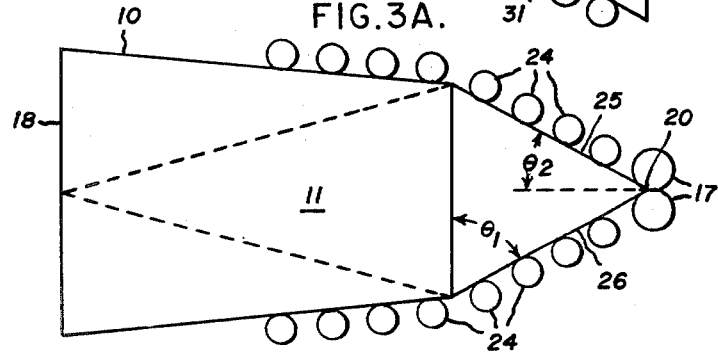
FIG. 3A is a side elevational view of FIG. 3.

Referring to FIG. 3B, it can be seen that during this flattening process, a point A on the square cross section moves directly and more perpendicularly to point A' on the flat cross section line 20. Similarly point B on the square cross section moves perpendicularly to the point B' and so on. A point C on the square section moves also in a relatively straight line to the point C' and then to C" on the flattened configuration. Intermediate points between B and C and points following C also move in this more perpendicular manner. Length of the paths of any point are substantially equal, e.g., the path length AA' is substantially equal to CC'C". Consequently the internal stresses in the film made by the process illustrated in FIG. 3 are greatly minimized so that the film in the flat position retains its flatness with minimum bagginess set up by internal stresses. Any point on the square section moves to the flattened section along relatively straight lines because of the rolls which are utilized at the flaring part of tube 10 between the frame 11 and the nip rolls 17 as illustrated in FIG. 3.

A further comparison of the results of the use of the flattening apparatus of FIG. 2 and the process and apparatus of FIG. 3 is shown in FIG. 4. In FIG. 4, the graph compares the percent deviation in path length in the two processes, i.e., the prior art process A and the process B of this invention.

These curves also take in to consideration the H/D ratio which is the ratio of the vertical height of the frame 11 to the diameter of the tube. Rolls are preferred in this invention although it is understood that tube surface engaging means such as moving belts or caterpillar arrangements may also be employed. The practice of this invention may also be accomplished by the well known air slide or air box process, or by slatlike surfaces which slide on and support the tube.

The collapse frame is designed to shape the bubble from a circular section to a square section which is then collapsed into a nip. The conventional frame configuration forces some portions of the bubble to travel longer distances to the nip than other portions. This rapid transition results in stretching certain areas of the film. (The geometry of the round-to-square transition results in minimum path length deviation when the vertical angle between the tangent of the circle and the midpoint of the square is 6° or less. The reason for the minimum deviation is that the sine and tangent functions are nearly equal.) Theoretically, there is no path length deviation in the square-to-flat transition just prior to the nip rolls 17. The new frame assembly 11 is most feasible where the bubble remains constant, i.e., where the bubble diameter entering frame assembly 11 remains constant. While some slight deviation from the square cross section can be accommodated a significantly rectangular cross section is to be avoided.

While this invention has been disclosed with respect to particular embodiments thereof, numerous modifications may be made by those skilled in the art without departing from its true spirit and scope. Therefore, it is intended that the appended claims cover all such modifications and variations which come within the true spirit and scope of the present invention.

What is claimed as new and desired to be secured by Letters Patent of the United States is:

1. A method of collapsing a continuously moving insufflated tube of thermoplastic material which comprises
    a. changing the cross section of said tube into a substantially square cross section by gradually converging said tube over an extended length thereof to a square section tube,
    b. diverging said square section tube to a flat or line section by passing said square section tube through flattening roller means,
    c. supporting the diverging tube in said flattening roller means in four planes to channel the diverging tube into progressively rectangular sections of progressively decreasing thicknesses and increasing widths going into said line section,
    d. and maintaining the diverging angle of the four planes essentially equal so that points on said square section arrive at said line section along lines essentially perpendicular thereto.

2. A method of collapsing a continuously moving insufflated tube comprising polypropylene at an elevated temperature which includes:
    a. passing the tube through a convergent trapezoidal frame assembly which frictionally engages said tube over an extended length thereof to change the cross section of the tube into a substantially square section with minimal stretching or compressing of said tube material,
    b. flattening said square section to a line section by passing the squared tube through a next adjacent divergent four plane, wedge shaped, frame assembly which frictionally engages and channels said squared tube into a tube having progressively decreasing thickness rectangular sections of increasing width to form said line section with minimal stretching or compressing of said tube material of said tube,
    c. and maintaining the diverging angle of each of said four planes essentially equal so that points on the said square section of said tube arrive at said line section along lines essentially perpendicular thereto.

3. The invention as recited in claim 2 wherein each said diverging angle is between 65° and 75°.

4. The invention as recited in claim 2 wherein the sides of said frame assemblies comprise a ladder like series of rollers which frictionally engage said tube.

5. The invention as recited in claim 2 wherein said convergent frame assembly converges at an acute angle of less than about 6° with the horizontal.

* * * * *